Patented Sept. 12, 1950

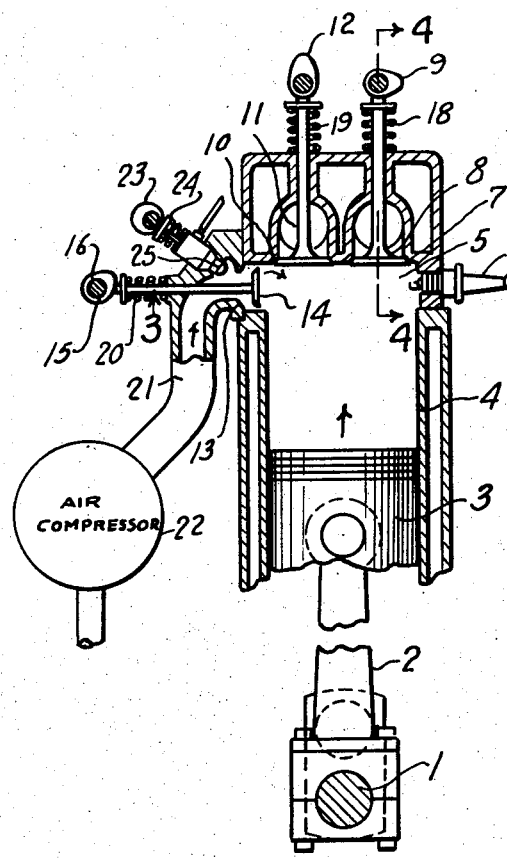

2,522,456

UNITED STATES PATENT OFFICE 2,522,456

INTERNAL-COMBUSTION ENGINE

Marion Mallory, Detroit, Mich.

Application November 13, 1948, Serial No. 59,828

4 Claims. (Cl. 123—34)

1

This invention relates to an internal combustion engine and more particularly to an internal combustion engine of the injection type.

It is an object of this invention to produce an internal combustion engine of the injection type which can be operated at very high compression without detonation and therefore is very efficient in operation.

Fig. 1 is a fragmentary vertical section through my engine showing the piston at the beginning of the compression stroke.

Fig. 2 is a fragmentary vertical section through my engine showing the piston near the completion of the compression stroke.

Figs. 3 and 4 are sections along the lines 3—3 and 4—4 of Fig. 1.

The elements of my engine are referenced as follows: crankshaft 1, connecting rod 2, piston 3, cylinder 4, combustion chamber 5, spark plug 6, exhaust port 7, exhaust valve 8, exhaust cam 9, air intake port 10, intake valve 11, intake valve cam 12, compressed air port 13 controlled by valve 14, cam shaft 15, cam 16 for controlling valve 14, valve springs 18, 19 and 20, compressed air conduit 21 connecting port 13 with air compressor 22.

It will be noted that my engine preferably is provided with a special combustion chamber 5 in the form of an elongated tunnel or channel. For purposes of description but not by way of limitation, the length of the combustion chamber 5 is shown as approximately equal to the diameter of cylinder 4 and the width is slightly less than the radius of the cylinder. It will also be noted that the spark plug 6 and the exhaust port 7 and exhaust valve 8 are located in one end of the combustion chamber and the intake port, intake valve, air inlet port, air valve and injection nozzle are located in the other end of the combustion chamber.

The operation of my engine is as follows: As piston 3 moves downwardly on the intake stroke, air alone is drawn in through port 10 by valve 11 which is open. Exhaust valve 8 and valve 14 are closed. Cam 16 will be timed to open valve 14 near the end of intake stroke of piston 3, that is, when the piston is on bottom center, Fig. 1, or, if preferred, valve 14 will open somewhat before the end of the intake stroke, that is, when the piston has traveled, say, for example, about 100° on its downward or suction stroke. Cam 16 will be timed to close valve 14 near the end of the compression stroke. When valve 14 opens, air under compression is forced through port 14 into the combustion chamber. Valves 8 and 11 will be closed on the compression as well

2 as on the power stroke of the engine. The pressure of the charging air admitted through port 13 is less than the maximum compression pressures of the air created on the compression stroke by piston 3.

Cam 23, which controls injection valve 24, will be timed to open valve 24 and cause injection of fuel through nozzle 25 after valve 14 has opened and the fuel will always be injected late enough to reduce pre-ignition. This makes possible the use of very high compression. The liquid fuel from injection nozzle 25 will be directed against valve 14. Cam 23 will be timed so that the injection will take place before the end of the compression stroke. If the injection takes place near the end of the compression stroke, detonation is eliminated because it takes time for the fuel and air to be mixed or prepared to a combustible state. Since the injection takes place during the latter part of the compression stroke, the charge will not reach a combustible state until the piston is about on dead center and the piston will be moving downwardly on the power stroke before the peak pressures which cause detonation can get started. I do not start the injection at the beginning of the compression stroke because then extremely high pressures could not be used since combustion would take place before the end of the compression stroke and there would be detonation. The injection time will vary, for example, if the engine is running under light throttle, the dwell of the injection will be short, and if the engine is running under full throttle, then the dwell of the injection will be long. Since nozzle 24 injects the fuel into the high velocity air stream flowing through port 13, the high velocity air will completely atomize the injected fuel and therefore effect a thorough mixture of the air and fuel.

Ignition takes place at or near the end of the compression stroke after the injection is completed and valves 8, 11 and 14 will be closed.

It will be noted that the exhaust valve 8 and spark plug 6 are situated at the end of combustion chamber 5 remote from injection nozzle 25. Combustion is initiated at spark plug 6 and exhaust valve 8 and the burning flame travels from the hot end of the combustion chamber to the cool end.

From the above it will be seen that my engine can be operated at extremely high compression without detonation and is therefore highly efficient.

I claim:

1. An internal combustion engine comprising a cylinder, a reciprocating piston in said cylinder, a combustion chamber at the upper end of said cylinder, ignition means in said combustion chamber, a valve controlled exhaust port for said combustion chamber, a valve controlled intake port for admitting air into said combustion chamber on the suction stroke of said piston, a valve controlled port for admitting air under pressure into said combustion chamber during, and closing near the end of, the compression stroke of said piston, and injection means for injecting liquid fuel into the air under pressure flowing through said last named air port when the same is open, the said injection means being timed to inject fuel into the compressed air stream as it flows into the combustion chamber during the latter part of the compression stroke of said piston.

2. An internal combustion engine comprising a cylinder, a reciprocating piston in said cylinder, a combustion chamber at the upper end of said cylinder, ignition means in said combustion chamber, a valve controlled exhaust port for said combustion chamber, a valve controlled intake port for admitting air into said combustion chamber on the suction stroke of said piston, a third port for said combustion chamber, a valve controlling said third port, an air compressor having its outlet communicating with said third port for forcing air under pressure through said third port into the combustion chamber, the valve for said third port being open during, and closing near the end of, the compression stroke of said piston, and injection means for injecting liquid fuel into the air stream as it flows through said third port, the said injection means being timed to inject fuel into the air stream during the latter part of the compression stroke of said piston.

3. The internal combustion engine as claimed in claim 2 wherein the valve controlled exhaust port and ignition means are located at an end of the combustion chamber remote from the two air inlet ports.

4. The internal combustion engine as claimed in claim 3 wherein the valve for said third port is a poppet valve and opens inwardly of the combustion chamber and wherein the injection means directs the liquid fuel against the said poppet valve.

MARION MALLORY.

REFERENCES CITED

The following references are of record in the file of this patent:

UNITED STATES PATENTS

| Number | Name | Date |
| --- | --- | --- |
| 1,769,675 | Bruckner | July 1, 1930 |
| 1,937,801 | Tibbetts | Dec. 5, 1933 |
| 2,011,986 | Schwarz | Aug. 20, 1935 |
| 2,024,929 | Joslyn | Dec. 17, 1935 |

FOREIGN PATENTS

| Number | Country | Date |
| --- | --- | --- |
| 560,834 | Great Britain | Apr. 18, 1944 |